Jan. 8, 1952     R. DAVIS     2,581,469
CONTAINER PERFORATOR
Filed Sept. 29, 1947
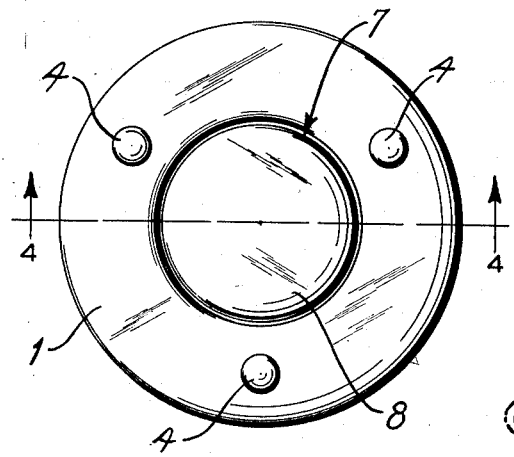
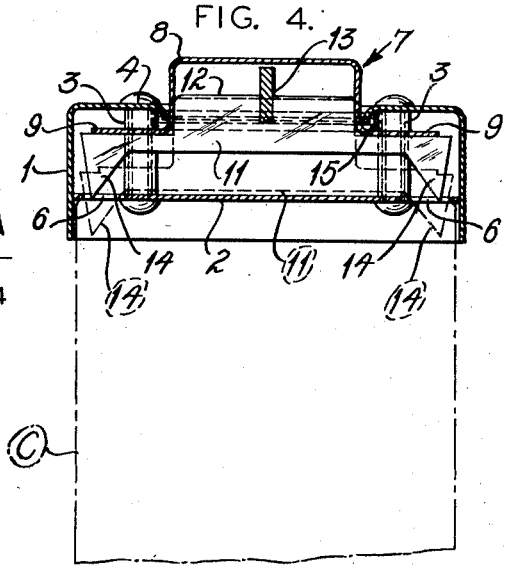
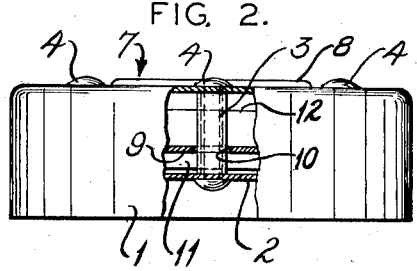
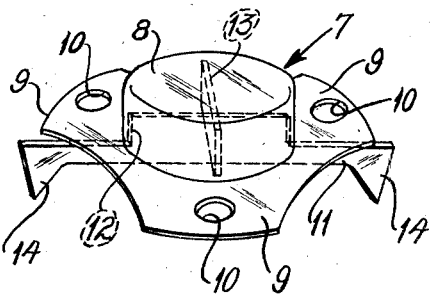
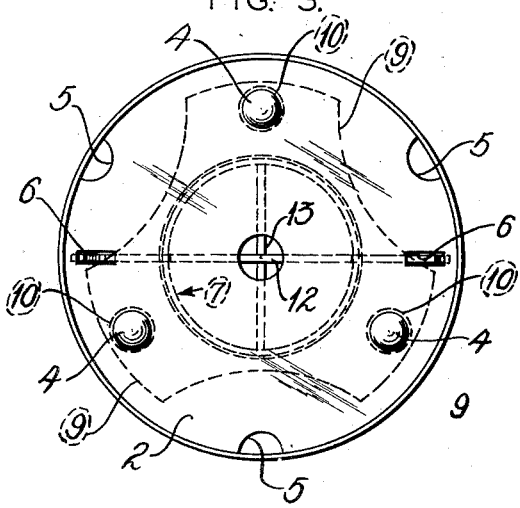
INVENTOR:
Roy Davis,
by Carr & Carr & Gravely,
HIS ATTORNEYS.

Patented Jan. 8, 1952

2,581,469

UNITED STATES PATENT OFFICE 2,581,469

CONTAINER PERFORATOR

Roy Davis, Overland, Mo.

Application September 29, 1947, Serial No. 776,794

2 Claims. (Cl. 30—6.1)

This invention relates to receptacle openers and in its more specific aspects is directed to a device for piercing the closures of containers for liquid food.

The object of this invention is to provide a device for quickly and easily perforating the closure for condensed milk containers in two diametrically disposed places and which may also serve as a closure for such containers after piercing.

In the drawings:

Fig. 1 is a plan view of a device incorporating the invention,

Fig. 2 is a side elevational view thereof with parts broken away to show details, Fig. 3 is a bottom plan view of the device incorporating the invention, Fig. 4 is a section view taken along the line 4—4 of Fig. 1 applied to a container; and Fig. 5 is a perspective view of the cutter mechanism and the support therefor.

Referring now to the drawings, numeral 1 designates a cylindrical tubular dished member provided with a centrally disposed aperture in its closed end. A circular plate 2 is supported in the dished member and is spaced a suitable distance from the closed apertured end thereof. This spacing is maintained by a plurality of sleeve members 3 disposed between the dished member 1 and the plate. Rivets 4 extend through each sleeve and through apertures in plate 2 and dished member 1 to rigidly hold plate 2 in position. The plate 2 is provided with a plurality of notches 5 whose primary function is to aid in cleaning the device and it is also provided with two diametrically disposed cutter slots 6, 6.

A cutter supporting member 7 is disposed in the aperture in the closed end of dished member 1 and comprises a hollow cylindrical member 8, one end of which is closed and the other opened. A plurality of flanges 9, 9 is provided thereon, preferably the same in number as rivets 4 and having apertures 10 therein through which sleeves 3 extend in order to guide the movement of member 7. The member 7 is fitted in the dished member 1 in a manner so that it may freely move axially thereof.

A cutter bar 11 is held in the supporting member 7. The cutter bar is preferably formed from flat plate or sheet stock and has a projection thereon that extends into cylindrical portion 8 of member 7. A plate 13 is also arranged in cylindrical member 8 and is disposed at right angles to cutter 11 whose function is to prevent tipping of the cutter bar 11. Blades 14, 14 are formed on the cutter bar 11 which are movable in slots 6, 6 and perforate the container top in at least two places.

A spring 15 is disposed between flanges 9 and dished member 1 to normally hold the member 7 in the dotted line position illustrated in Fig. 4.

The device is fitted over the top of a container designated "C," it being understood that the diameter of dished member 1 is such that it will snugly fit thereover. Pressure applied to member 1 after cutter blades 14, 14 engage the top of the container compresses the spring 15 and places member 7 and cutter 11 in the full line position indicated in Fig. 4. Pressure is now applied to member 7 which causes the cutter blades 14, 14 to perforate the container top, the cutter bar 11 and member 7 being moved to the dotted line position of Fig. 4 to complete the cutting operation. The device may be used as a cover for the container when it is stored in the refrigerator or any other suitable place, thereby keeping the container contents clean and sanitary. The device is rotated when used as a closure until the blades 14 enter the container top perforations.

What I claim is:

1. A container perforating and closure device comprising a tubular member provided with an apertured closure at one end thereof; a plate provided with cutter blade apertures; means for supporting said plate in said tubular member which includes a plurality of circumferentially arranged sleeves for maintaining a predetermined spacing between said apertured closure and said plate; a second tubular member provided with a closure at one end thereof and arranged in the aperture of said apertured closure; a plurality of apertured flanges secured to the other end of said second tubular member, said sleeves disposed within the apertures in said flanges and capable of movement relative thereto; a cutter bar; means for supporting said cutter bar on the flanged end of said second tubular member; cutting blades on said bar and movable in the apertures in said plate; and a spring for moving said tubular members relative to each other.

2. A container perforating and closure device comprising a tubular member to be fitted over one end of the container; an apertured closure at one end of said tubular member; a plate disposed within said tubular member and provided with cutter slots; means for mounting said plate in said tubular member and spacing it from said apertured closure; a second tubular member provided with a closure and extending through the aperture in said first mentioned closure and adapted for movement along the longitudinal axis of said first mentioned tubular member; means on said second tubular member cooperating with said first mentioned means for guiding the movement of said second tubular member; a cutter; means for supporting said cutter on one end of said second tubular member and for movement in the slots in said plate; and a spring for moving said tubular members relative to each other.

ROY DAVIS.

REFERENCES CITED

The following references are of record in the file of this patent:

UNITED STATES PATENTS

| Number | Name | Date |
| --- | --- | --- |
| 1,887,592 | Goodfellow | Nov. 15, 1932 |
| 1,888,411 | Schilling | Nov. 22, 1932 |
| 1,923,779 | Dye | Aug. 22, 1933 |
| 2,064,716 | Baker | Dec. 15, 1936 |